P. H. CRESSE.
Corn-Planter.
No. 211,622.　　　　Patented Jan. 28, 1879.
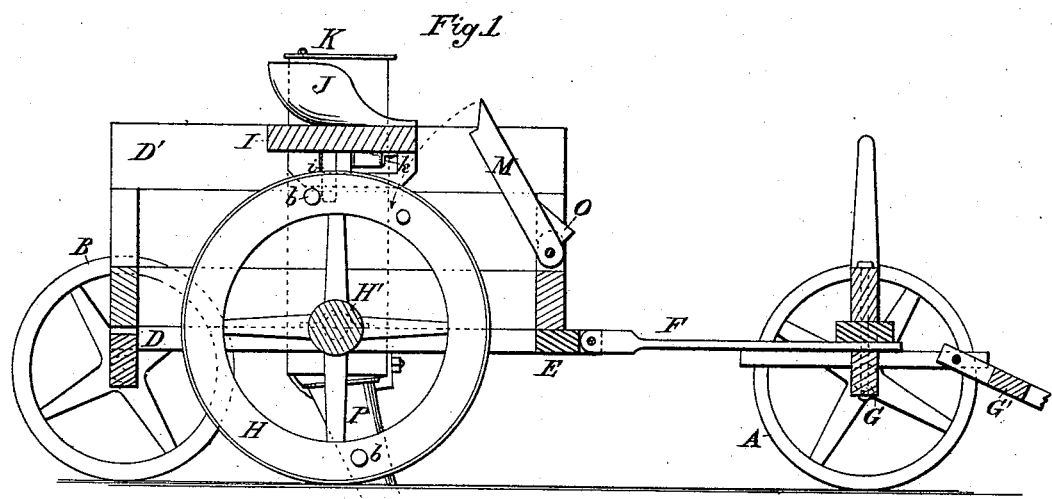
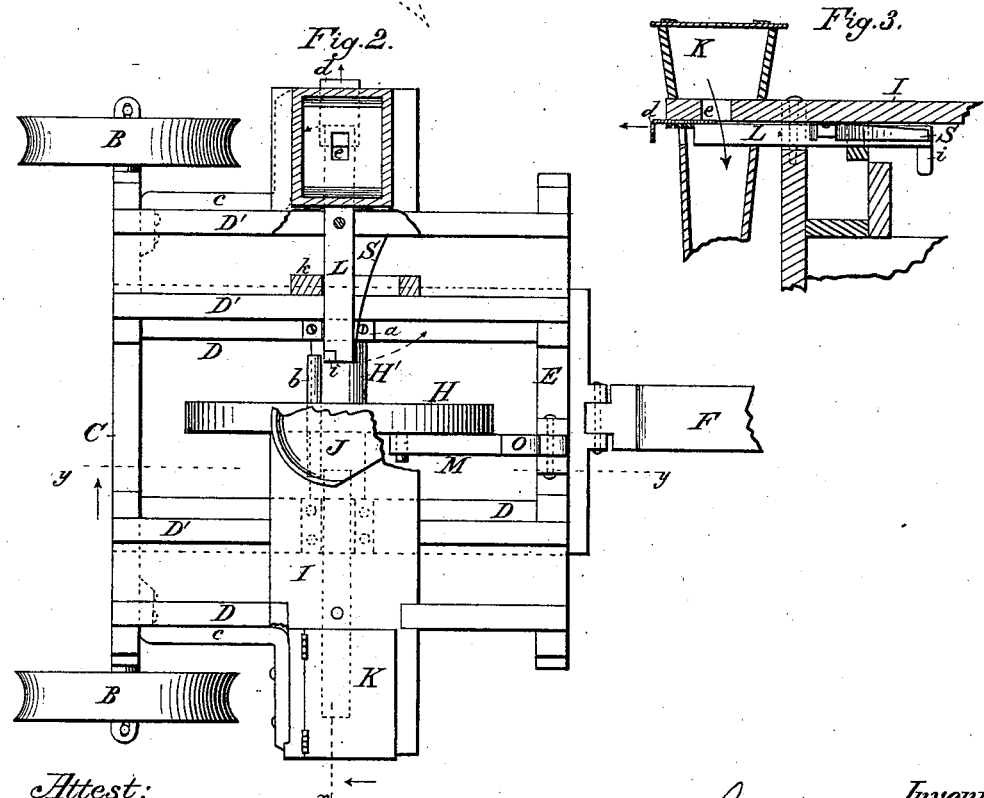
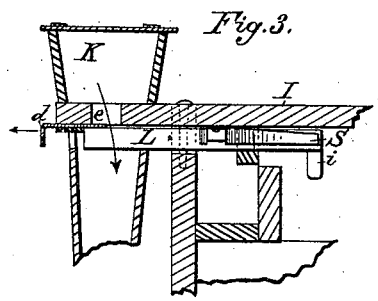
Attest:
H. H. Schott
D. P. Cowl
Inventor
Philip H. Cresse

UNITED STATES PATENT OFFICE.

PHILIP H. CRESSE, OF CAPE MAY, NEW JERSEY.

IMPROVEMENT IN CORN-PLANTERS.

Specification forming part of Letters Patent No. 211,622, dated January 28, 1879; application filed November 6, 1878.

*To all whom it may concern:*

Be it known that I, PHILIP H. CRESSE, of Cape May, in the county of Cape May and State of New Jersey, have invented certain new and useful Improvements in Corn-Planters; and I do hereby declare that the following is a full, clear, and exact description thereof, which will enable others skilled in the art to which they appertain to make and use the same, reference being had to the accompanying drawings, and to letters of reference marked thereon, which form a part of this specification.

This invention relates to a corn-planter of that class in which the seed-carrying, regulating, and discharging apparatus is mounted upon supporting-wheels, two of which act as coverers for the seed, while the others support and guide the front end of the machine, and a fifth-wheel supports the center and gives motion to the dropping slide or lever; the object aimed at being to increase the efficiency and place the working parts thoroughly under the control of the operator.

The subject-matter claimed will be hereinafter fully described, and then specifically designated.

The accompanying drawings illustrate all my improvements as applied to one type or form of machine. Obviously, however, some of the improvements may be used without the others in machines differing somewhat in construction and operation from that herein shown.

Figure 1 is a vertical longitudinal section of the machine on the line $y$ of Fig. 2, showing the relative position of the actuating-wheel to the carrying-wheels and other parts of the machine. Fig. 2 is a plan, partly in section, for the purpose of illustrating more clearly the dropping apparatus. Fig. 3 is a vertical section on the line $x$ of Fig. 2 through one of the hoppers, showing the position and method of operating the adjustable slide, by means of which the quantity of seed dropped is regulated.

The front end of the machine is carried upon a pair of wheels, A, mounted upon either end of the axle G, to which is connected a tongue, G', in the manner commonly used for farm-wagons. In fact, this part of the ordinary wagon running-gear may be employed for this purpose, if desired, without going to the expense of procuring a separate gear to perform the duty.

The rear end of the machine is carried by the wheels B, which rotate upon opposite ends of the axle C. These wheels B are provided with a concave tread, as shown. By this manner of constructing the periphery of the wheels they tend to press the earth toward a central line in which the seed is dropped, causing the latter to be well covered and the earth properly pressed down upon them.

A series of bars, D, connect the rear axle with a cross-bar, E, to which the reach F is hinged, so as to give free vertical movement, but prevent all lateral motion of the parts, the front end of this reach being connected to the forward axle by a king-bolt, as in the ordinary connection of the rear and front axles of wagons. The actuating-wheel H is placed in the middle of the frame formed by the bars D, cross-bar E, and the rear axle, G, being carried or mainly supported upon the rotating axle H', which revolves in bearings $a$, attached to the under side of the bars D. Projecting from both sides of this wheel H are the pins $b$, placed at such distances apart as will give the proper spaces between the hills of corn or other seed to be planted. Traversing the machine from side to side, and sustained by the bars D', is the seat-support I, which not only carries the seat J, but ties the frame together, and forms a point of attachment for the levers which operate as the seed-slides. The hoppers K are secured to the frame at the sides, being strongly braced and prevented from detachment by the angle-irons $c$, which are securely bolted to the rear side of the hoppers and to the bars D. The transverse seat-support passes through the hoppers and forms a bottom to the same, through which the rectangular orifice $e$ is formed. A slide, $d$, regulates the size of this orifice, so as to determine the quantity of seed to be planted in each hill.

Pivoted to the under side of the transverse support I is a lever, L, one end of which swings under and closes the seed-aperture $e$, thus taking the place of the seed-slide used in other machines, while the other carries a downwardly-projecting arm, $i$. This arm, as the wheel H rotates, is caught by the pins $b$, and carried with it sufficiently to allow the seed contained in the space between the end of the slide $d$ and side of the opening $e$ to fall through. The lever is then instantly forced back to its normal position against the stop $k$ by a spring, S, which is secured to the bars D', with its free end bearing against the lever.

It is thus apparent that as the machine proceeds the rotation of the wheel H will cause the seed to be dropped at regular intervals proportioned to the distance between the pins $b$ in the periphery of the wheel. In turning, and at other times when it is desired to stop the dropping of seed, a stop-lever, M, hinged to the bar E, is allowed to drop until its end comes in contact with one of the pins $b$ in the wheel H, which prevents the rotation of the latter, causing it to be drawn over the ground like the runner of a sled, too great friction being prevented by the joint between the frame and reach, which allows the frame to lift and ride over obstructions without carrying the rest of the machine with it.

In order to raise the stop-lever from the pins $b$ it is provided at its pivoted end with a projection or foot-rest, O, against which the foot of the driver is pressed. In order to open furrows in which to deposit the seed, the furrow-openers P are bolted to the lower end of the hoppers, projecting downward to a sufficient distance to open the furrow to the requisite depth. They also form a channel, through which the seed is conducted from the hopper to its place in the furrow before being covered by the covering-wheels B.

From the foregoing description of my improved machine its operation will readily be understood; and it will be seen that the grains of corn dropped through the furrow-openers in front of and about in line with the centers of the concave treads of the rear wheels will be hilled over and covered by a ridge of earth formed of the soil crowded or worked up by the wheels.

Having thus described my invention, I claim as new, and desire to secure by Letters Patent, the following:

In a four-wheel corn-planter, the combination of the hinged reach F with the main frame, supported by the concave covering-wheels B B, hinged furrow-openers P, hoppers K, horizontal levers L, having arms $i$, springs S, graduated cut-off slides $d$, and wheel H, provided with pins $b$, the whole arranged, constructed, and operated in the manner and for the purpose set forth.

In testimony that I claim the foregoing as my own I hereunto affix my signature in presence of two witnesses.

PHILIP H. CRESSE.

Witnesses:
DAVID H. HAND,
DAVID T. SMITH.